United States Patent [19]

Malec

[11] 4,115,201

[45] Sep. 19, 1978

[54] OIL RECLAIMER

[76] Inventor: Jerry P. Malec, 10524 E. Pine, Tulsa, Okla. 74116

[21] Appl. No.: 699,938

[22] Filed: Jun. 25, 1976

[51] Int. Cl.² .................. B01D 3/28; B01D 35/18; C10G 7/00

[52] U.S. Cl. .................. 196/46.1; 196/128; 210/180; 210/350; 210/456

[58] Field of Search ............ 196/46.1, 128; 210/180, 210/184, 350, 456

[56] References Cited

U.S. PATENT DOCUMENTS

| | | | |
|---|---|---|---|
| 2,086,763 | 7/1937 | Bradford | 196/46.1 |
| 2,219,101 | 10/1940 | Finwall | 210/180 X |
| 2,232,423 | 2/1941 | Alkire | 210/350 |
| 2,785,109 | 3/1957 | Schwalge | 196/128 X |
| 2,839,196 | 6/1958 | Schwalge | 210/180 |
| 3,556,302 | 1/1971 | Agranat | 210/456 X |
| 3,616,885 | 11/1971 | Priest | 196/46.1 X |
| 3,915,860 | 10/1975 | Priest | 210/180 X |
| 4,006,084 | 2/1977 | Priest | 196/46.1 |

Primary Examiner—Morris O. Wolk
Assistant Examiner—Michael S. Marcus
Attorney, Agent, or Firm—Zarley, McKee, Thomte, Voorhees & Sease

[57] ABSTRACT

An apparatus for removing impurities from lubricating oil comprising a container having a filter positioned in the lower end thereof with an evaporator plate positioned above the filter. The lubricating oil enters the container through an inlet opening formed in the lower end thereof with the oil being passed upwardly through the filter. The oil is dispersed or redistributed at the lower end of the evaporator plate so that the oil is moved to the center thereof and moved upwardly through a central opening. The evaporator plate has a plurality of annular concentric tiers provided on its upper end so that the oil passing through the upper end of the central opening in the evaporator plate flows downwardly and outwardly over the concentric tiers. A ring-shaped heating element is positioned in the container and extends around the upper end of the evaporator plate at the periphery thereof for heating the oil passing downwardly over the concentric tiers. The container has a cover positioned on the upper end thereof and has an oil outlet conduit extending from the upper end thereof.

8 Claims, 7 Drawing Figures

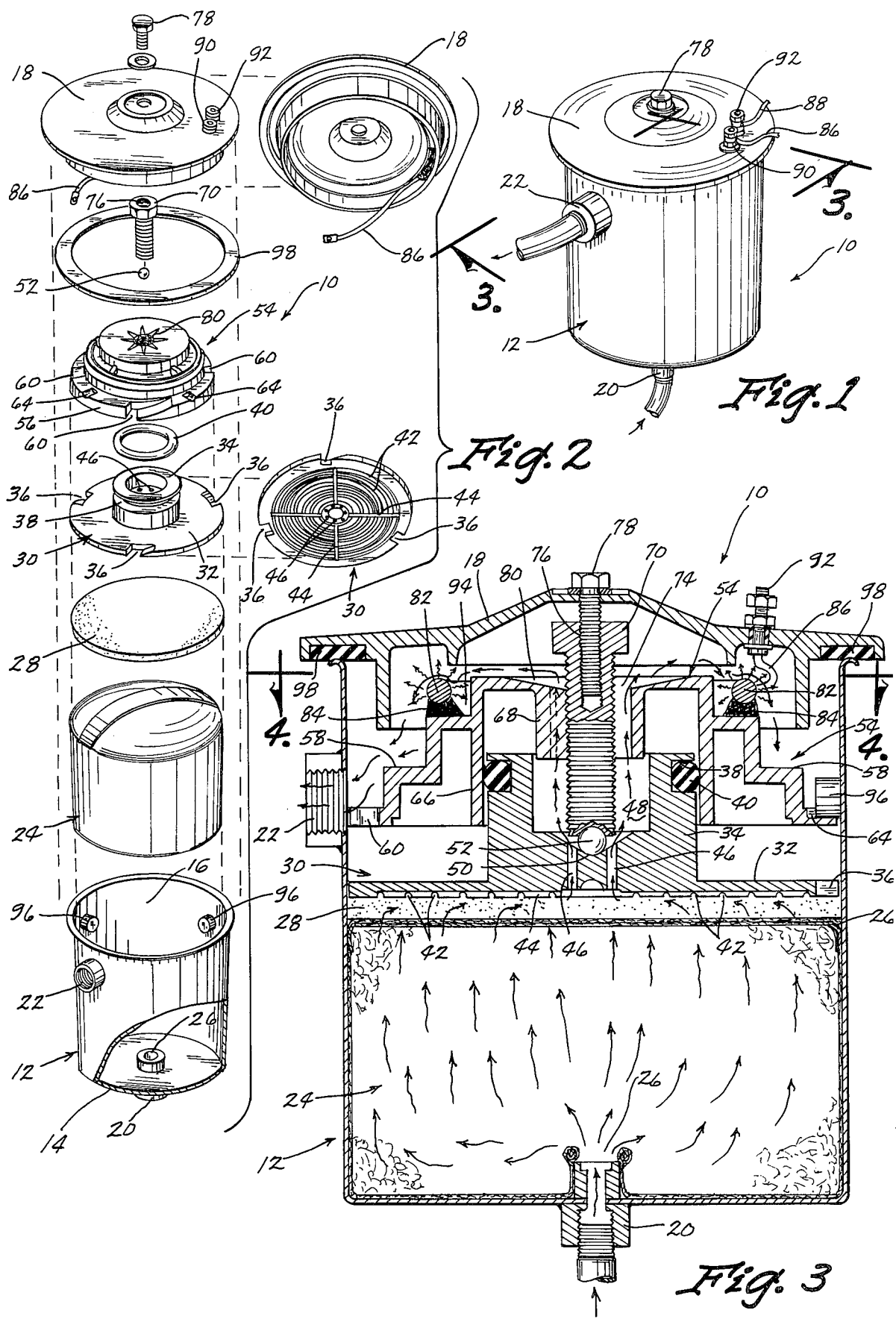

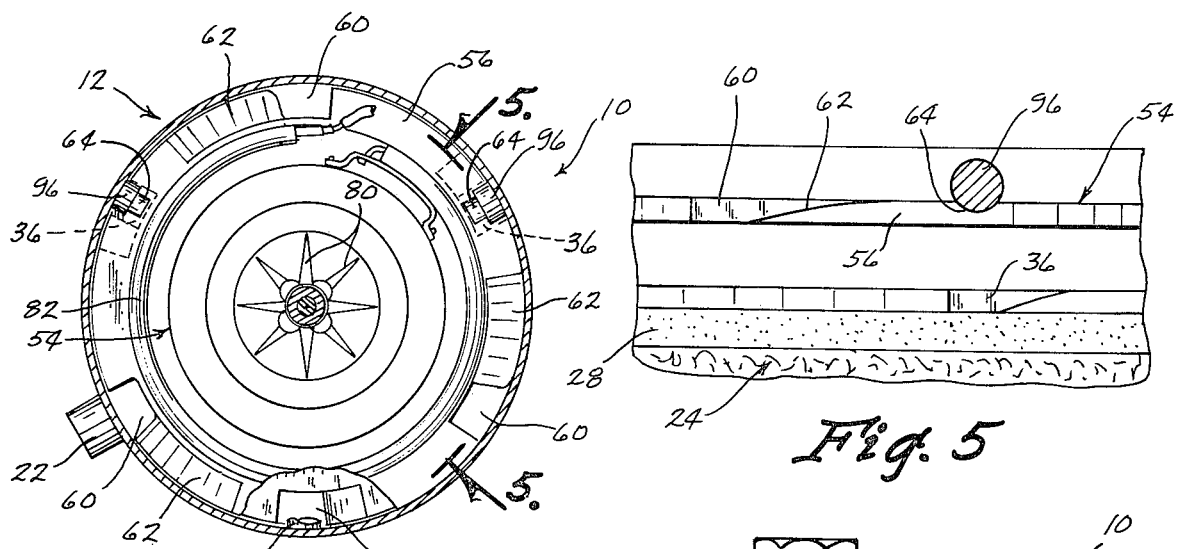
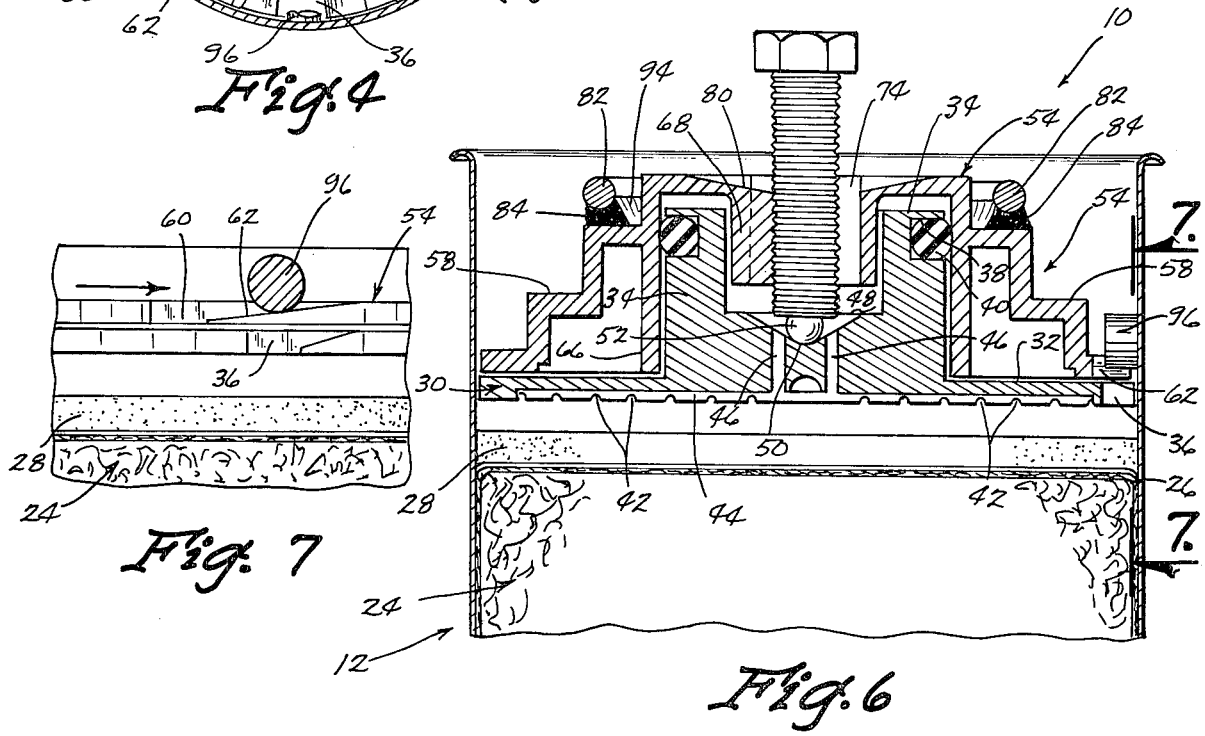

OIL RECLAIMER

BACKGROUND OF THE INVENTION

This invention relates to an oil reclaimer and more particularly to an apparatus for removing the impurities from lubricating oil.

Oil reclaimers have been previously patented with the apparatus thereof designed to cause the volatile contaminants in lubricating oil to be removed therefrom by vaporization. One type of oil reclaimer is disclosed in U.S. Pat. No. 3,616,885 and the instant invention is a significant improvement thereover. In the oil reclaimer of the above-identified patent, the lubricating oil is passed through a filter and moved upwardly through a plurality of capillary tubes so that a heating element may heat the oil to cause the volatile contaminants to remove therefrom by vaporization. However, the heating element of the prior art device objectionably heats the components of the oil reclaimer which results in a substantial heat loss thereby reducing the overall efficiency of the apparatus since a limited amount of electrical current is available to the apparatus. Additionally, it is extremely difficult to manually position the components in the device of the prior art and it is believed that the oil is not properly filtered and reclaimed.

Therefore, it is a principal object of the invention to provide an improved oil reclaimer.

A still further object of the invention is to provide an oil reclaimer including means for facilitating the positioning of the components within the reclaimer container.

A further object of the invention is to provide an oil reclaimer having means for preventing the heater from objectionably transferring heat to other components of the device.

A further object of the invention is to provide an oil reclaimer having a novel means for "trapping" the oil while heating the same to more efficiently remove volatile contaminants therein.

A further object of the invention is to provide an oil reclaimer having means therein for compressing the oil filter so that more efficient filtering is achieved.

A still further object of the invention is to provide an oil reclaimer which is economical to manufacture, durable in use and refined in appearance.

BRIEF DESCRIPTION OF THE DRAWINGS

FIG. 1 is a perspective view of the reclaimer of this invention:

FIG. 2 is an exploded perspective view of the oil reclaimer:

FIG. 3 is an enlarged sectional view seen on lines 3—3 of FIG. 1:

FIG. 4 is a sectional view seen on lines 4—4 of FIG. 3:

FIG. 5 is an enlarged sectional view seen on lines 5—5 of FIG. 4:

FIG. 6 is a view similar to FIG. 3 but which illustrates the components of the device being assembled; and FIG. 7 is a view similar to FIG. 6 but illustrating the evaporator plate in a different position as will be described in more detail hereinafter.

DESCRIPTION OF THE PREFERRED EMBODIMENT

The oil reclaimer of this invention is referred to generally by the reference numeral 10 and comprises a container 12 having a lower end 14 and an open upper end 16. Cover 18 is provided for closing the upper end of the container as will be described hereinafter.

Container 12 is provided with an inlet port 20 at its lower end which is in communication with a source of oil to be reclaimed. Container 12 is provided with an outlet port 22 which is adapted to be placed in communication with a return line or the like.

The numeral 24 refers to a filter having a central opening 26 formed at its lower end which is adapted to receive the inner end of the port 20 as illustrated in FIG. 3. Filter 24 is comprised of a filter material arranged or placed within an outer shell referred to generally by the reference numeral 26. A disc-shaped filter 28 is positioned above filter 24 and has the same diameter as the interior diameter of container 12. The diameter of filter 24 is slightly less then the inside diameter of container 12 to facilitate the insertion and removal thereof.

The numeral 30 refers to an evaporator plate support generally comprising a disc-shaped base 32 having a hub portion 34 extending upwardly therefrom. Support 32 is provided with a plurality of openings 36 formed in the periphery thereof. The exterior surface of hub 34 is provided with an annular groove 38 formed therein adapted to receive an O-ring 40. As seen in the drawings, the bottom surface of base 32 of support 30 is provided with a plurality of concentric grooves formed therein. Radially extending grooves 44 traverse the grooves 42 and extend from the outermost groove 42 to the center portion of the base and communicate with a plurality of vertically extending bores 46 extending upwardly through hub 34 to a centrally disposed recessed area referred to generally by the reference numeral 48. Hub 34 is provided with a ball seat 50 for receiving a ball 52 as seen in FIG. 3.

Evaporator plate 54 generally comprises a base 56 having a plurality of annular concentric tiers or flat surfaces 58 arranged so as to define a truncated cone shape. Base 56 is provided with a plurality of openings 60 formed in the periphery thereof which communicate with inclined ramp surfaces 62 formed in base 56 as seen in FIG. 2. Base 56 is also provided with a plurality of indentations 64 formed in its upper outer surface as also seen in FIG. 3. Evaporator plate 54 is provided with a downwardly extending cylindrical portion 66 which is adpated to receive the hub 34 (FIG. 3) so that O-ring 40 sealably engages the same. Evaporator plate 54 is also provided with a downwardly extending cylindrical portion 68 which is adapted to be received by the cavity or area 48. Bolt 70 is threadably mounted in cylindrical portion 68 and has a recessed area in its lower end adapted to receive the ball 52 as seen in FIG. 3. Cylindrical portion 68 is provided with a plurality of communicating openings 74 which extend upwardly therethrough around bolt 70. As stated, the openings 74 communicate with each other and such communication is further enhanced by the ability of the oil to migrate around the bolt through the threaded area. The upper end of bolt 70 is provided with an internally threaded bore 76 adapted to receive bolt 78. As seen in FIG. 3, the upper surface of evaporator plate 54 is provided with a plurality of outwardly extending grooves 80 provided to disperse the oil outwardly from the central portion of cylindrical portion 68.

A heating element 82 is positioned above one of the horizontal surfaces 58 as seen in FIG. 8 and is thermally insulated therefrom by means of a heat insulative material 84 which also supports the heating element 82. Leads 86 and 88 are connected to the heating element 82 and extend therefrom in conventional fashion. Leads 86 and 88 are adapted to be connected to the terminal posts 90 and 92 provided in the cover element 18. As seen in FIG. 3, heating element 82 is positioned with respect to the evaporator plate so as to create a "dam" area 94 between the heating element and the vertical wall of one of the tiers.

The method of assembling the reclaimer is as follows. Filter 24 is inserted downwardly into the open upper end of the container 12 so that the central opening 26 receives the port 20. Filter 28 is then positioned on the upper end of filter 24. Evaporator plate 54 is positioned on the support 30 so that the lower end of bolt 70 receives the ball 52. Bolt 70 would be threadably rotated to permit the cylindrical portion 68 to be received well within the cavity 48 so that the base portions 32 and 56 would be closely positioned adjacent each other. With the base portions 32 and 56 closely positioned, evaporator plate 54 is rotated with respect to the support 30 so that the openings 60 are aligned or register with the openings 36. The evaporator plate 54 and support 30 are then lowered downwardly into the interior of the container so that the aligned openings 36 and 60 receive the inwardly extending lugs 96. The evaporator plate 54 and support 30 are moved downwardly within the container 12 until the lugs 96 are positioned within the openings 60. Evaporator plate 54 is then rotated with respect to the container 12 in a clockwise direction as viewed in FIG. 2. Rotation of the evaporator plate 54 in a clockwise direction as viewed in FIG. 2 causes the evaporator plate 54 to ride downwardly with respect to the lugs 96 due to the ramps 62. The ramps 62 enable the evaporator plate 54 to be more easily rotated with respect to the container and the evaporator plate 54 is rotated until the indentations 64 receive the lugs 96.

Bolt 70 is then threadably rotated to cause support 30 to be moved downwardly with respect to the evaporator plate 54, which is held in position by the lugs 96, so that the filters 24 and 28 are compressed. The compression of the filter 24 by the support 30 causes the filter to be forced outwardly into intimate engagement with the interior surface of the container 12 so that oil cannot pass between the filter and the interior wall surface but must pass through the filter. When the support 30 has been properly positioned, cover 18 is positioned on the open upper end of the container and bolt 78 threadably inserted into the upper end of bolt 70 so that seal or gasket 98 sealably closes the upper end of the container. Inlet port 20 is then placed in communication with the sources of oil to be reclaimed and outlet opening 22 is placed in communication with a return line. Heating element 82 is then actuated.

The oil passes into the interior of the container through the port 20 and is filtered upwardly through the filter 24 and filter 28. The upwardly moving oil comes into contact with the lower end of the support 30 which has the grooves 42 and 44 which act as an oil dispersion or redistribution means. The grooves 42 and 44 causes the oil to be moved towards the center of the support 30 so that the oil moves upwardly through the grooves 34, into the cavity 48 and thence upwardly through the openings 70. The oil moves outwardly over the upper end of the evaporator plate and passes downwardly into the area referred to generally by the reference numeral 94. When area 94 is filled with oil, the oil flows over the upper end of the heating element and thence downwardly over the tiers 58. The heating element 82 heats the oil passing thereover and heats the oil trapped in the area 94 so that volatile contaminants in the oil are removed by vaporization. It is important to note that the area 94 traps the oil in a damlike manner to more efficiently move the contaminants from the oil. It is also important to note that the heating element 82 is insulated from the evaporator plate 54 so that heat from the heating element 82 is not transferred to the evaporator plate 54 which would seriously reduce the effectiveness of the heating element. The vaporized contaminants may be vented out of the container by any convenient means. The oil which has been filtered and had the contaminants removed therefrom is moved outwardly or passes outwardly through the opening 22.

Thus it can be seen that a novel oil reclaimer has been provided which permits the volatile contaminants therein to be removed therefrom by vaporization and by filtering in an efficient manner. It can also be seen that a novel means has been provided for compressing the filter 24 therein to insure that the oil cannot bypass the filter. Additionally, it can be seen that a novel means has been provided for assembling the apparatus without requiring tremendous external forces to be applied to the components to assemble the same and to compress the filter. It can therefore be appreciated that the invention accomplishes at least all of its stated objectives.

I claim:

1. An apparatus for removing impurities from lubricating oil, comprising,
   a container having upper and lower ends,
   said container having an oil inlet opening formed in its lower end for receiving the oil,
   a filter material in the lower end of said container,
   a redistribution plate means within said container above said filter material,
   an evaporator plate means within said container above said redistribution plate means and having a diameter substantially equal to the diameter of said container to define a vaporization chamber thereabove, said evaporator plate means having upper and lower ends,
   said redistribution plate means having oil redistribution means on the lower end for causing the oil adjacent thereto to be moved towards the center of said redistribution plate means, and thence upwardly through a central opening formed therein,
   said evaporator plate means having a central opening formed therein extending between its upper and lower ends whereby the oil moved to the center of the lower end of said redistribution plate means will pass upwardly through said central opening of said evaporator plate means,
   said evaporator plate means having a plurality of annular concentric tiers provided on its upper end whereby the oil passing through the upper end of said central opening of said evaporator plate means will flow downwardly and outwardly over said concentric tiers,
   a ring-shaped heating element positioned in said container and extending around the upper end of said evaporator plate means at the periphery thereof for heating the oil passing downwardly over said concentric tiers, a cover means extending over the upper end of said container, and means for conducting oil from the upper ends of said container, said oil redistribution means comprising a plurality of concentric grooves formed in the lower end of said redistribution plate means and a plurality of radially extending grooves formed in the lower end of said redistribution plate means which communicate with said concentric grooves and which extend from the outermost concentric groove to the center of said redistribution plate means for communication with said central opening in said redistribution plate means.

2. The apparatus of claim 1 wherein heat insulation means is positioned between said heating element and said evaporator plate means so that the heat from said heating element will not be conducted to said evaporated plate means.

3. The apparatus of claim 1 wherein said redistribution plate means is selectively vertically mounted on said evaporator plate means.

4. The apparatus of claim 3 wherein a bolt means threadably extends downwardly through said central opening in said evaporator plate means for engagement with said redistribution plate means whereby said redistribution plate means may be selectively vertically moved downwardly relative to said evaporator plate means to compress said filter material.

5. The apparatus of claim 4 wherein said container has lug members provided on the interior wall surface thereof for engagement with said evaporator plate means to limit the upper movement of said evaporator plate means.

6. The apparatus of claim 5 wherein said evaporator plate means is provided with at least a pair of spaced-apart openings formed in the periphery thereof for receiving said lug members, said evaporator plate means having recessed portions formed in its upper surface at the periphery thereof for receiving said lug members therein after said openings have received said lug members and said evaporator plate means has been selectively rotated with respect to said container.

7. The apparatus of claim 6 wherein said evaporator plate means has an inclined ramp formed in the upper surface thereof adjacent the periphery thereof extending upwardly and laterally from said openings towards said recessed portions.

8. The apparatus of claim 4 wherein said evaporator plate means has a central cylindrical cavity formed in the lower end thereof, said redistribution plate means having a cylindrical portion sealably and selectively vertically received by said cavity.

* * * * *